United States Patent [19]
Takoh et al.

[11] Patent Number: 5,804,611
[45] Date of Patent: Sep. 8, 1998

[54] COMPOSITION USED FOR HYDROPHILIZATION AND METHOD FOR HYDROPHILIZATION USING SAID COMPOSITION

[75] Inventors: Noboru Takoh; Masahiro Kondo; Hiroshi Inoue, all of Hiratsuka, Japan

[73] Assignee: Kansai Paint Co., Ltd., Japan

[21] Appl. No.: 710,650

[22] Filed: Sep. 18, 1996

[30] Foreign Application Priority Data

Sep. 22, 1995 [JP] Japan ..................................... 7-268031

[51] Int. Cl.$^6$ ..................... C09D 171/02; C09D 133/14; C09D 133/24
[52] U.S. Cl. ..................... 523/122; 524/166; 524/265; 524/377; 524/378; 525/113; 525/124; 525/128; 525/133; 525/162; 525/187
[58] Field of Search ..................... 525/187, 113, 525/124, 128, 133, 162; 524/377, 166, 265, 378; 523/122

[56] References Cited

U.S. PATENT DOCUMENTS

| | | | |
|---|---|---|---|
| 4,503,907 | 3/1985 | Tanaka | 524/601 |
| 5,280,054 | 1/1994 | Sakai | 523/521 |
| 5,478,872 | 12/1995 | Yamagoe | 524/45 |
| 5,621,058 | 4/1997 | Kondo | 526/264 |

FOREIGN PATENT DOCUMENTS

| | | |
|---|---|---|
| 268747 | 10/1989 | Japan . |
| 003251 | 1/1996 | Japan . |

*Primary Examiner*—David Buttner
*Attorney, Agent, or Firm*—Wenderoth, Lind & Ponack, L.L.P.

[57] ABSTRACT

The present invention relates to a composition used for hydrophilization, which comprises:

(A) a compound having a polyoxyalkylene chain, and
(B) hydrophilic crosslinked polymer fine particles made of a copolymer composed of:
  2–50% by weight of (a) a hydrophilic monomer having a polymerizable double bond and a polyoxyalkylene or polyvinylpyrrolidone chain,
  20–97% by weight of (b) a (meth)acrylamide type monomer,
  1–30% by weight of (c) a crosslinkable unsaturated monomer,
  2–50% by weight of (d) a carboxyl group-containing polymerizable unsaturated monomer, and
  0–50% by weight of (e) a monomer having one polymerizable unsaturated group in the molecule, other than the monomers (a), (b), (c) and (d).

Said composition can form a hydrophilic film superior in retention of hydrophilicity, stability and press formability, on, for example, the surfaces of heat exchanger fins.

19 Claims, No Drawings

COMPOSITION USED FOR HYDROPHILIZATION AND METHOD FOR HYDROPHILIZATION USING SAID COMPOSITION

BACKGROUND OF THE INVENTION

1. Field of the Invention

The present invention relates to a composition used for hydrophilization, capable of forming a coating film superior in retention of hydrophilicity; a method for hydrophilization of heat exchanger fins, using the composition; and heat exchanger fins coated with the composition.

2. Description of the Prior Art

In the heat exchangers used in air conditioners, the condensed water produced during air cooling becomes waterdrops and forms a water bridge between the fins of heat exchangers, narrowing the air passages; as a result, various inconveniences arise such as increased resistance to air flow, waste of electric power, generation of noise, scattering of waterdrops and the like. In order to prevent such phenomena, it is now conducted, for example, to impart hydrophilicity to the surfaces of aluminum-made fins (aluminum-made fins are hereinafter referred to simply as fins) to prevent the formation of waterdrops and the bridge made thereby.

As the methods for hydrophilization of the surfaces of fins, there can be cited, for example, (1) a method by boehmite treatment, which is known as a method for treating the surface of aluminum; (2) a method of coating a water glass represented by general formula $mSiO_2/nNa_2O$ [e.g. Japanese Patent Publication No. 1347/1980 and Japanese Patent Application Kokai (Laid-Open) No. 126989/1983]; (3) a method of coating a paint which is a mixture of an organic resin with silica, water glass, aluminum hydroxide, calcium carbonate, titania, etc., or a paint which is a combination of said paint with a surfactant [e.g. Japanese Patent Publication No. 46000/1982, Japanese Patent Publication No. 8372/1984, U.S. Pat. No. 4,503,907 (corresponding to Japanese Patent Publication No. 61078/1987), EP-B-128,514 (corresponding to Japanese Patent Application Kokai (Laid-Open) No. 229197/1984) and Japanese Patent Application Kokai (Laid-Open) No. 225044/1986]; and (4) a method of coating a paint comprising an organic-inorganic (silica) composite resin and a surfactant [Japanese Patent Application Kokai (Laid-Open) No. 170170/1984]. Some of these methods are already in practical use.

Thus, some of the techniques for hydrophilization of heat exchangers are in practical use. They, however, need improvements because the plates endowed with hydrophilicity by these techniques, still have problems in retention of hydrophilicity (contact angle to waterdrop, whole-surface wettability with water, corrosion resistance, odor, etc.

In recent years, heat exchangers have become smaller and more lightweight, which has made smaller the distance between fins, and higher hydrophilicity has become necessary for the fins. No sufficient retention of hydrophilicity can be achieved with the above methods (3) and (4).

The method (1) by boehmite treatment has problems in corrosion resistance and further in press workability because the formed film is hard. The method (2) of coating a water glass enables the formation of a film of good hydrophilicity retention (contact angle of treated fin to waterdrop: 20° or less), but the film becomes powdery with the lapse of time and scatters during air flow, generating a cement-like or chemical-like odor. Moreover, the water glass is hydrolyzed by the condensed water produced during the operation of heat exchanger and the surface of fin becomes alkaline, easily causing pitting; besides, it is known that the resulting aluminum hydroxide white powder (a corrosion product) scatters, and this poses a problem in environmental protection.

The methods for treatment of the surface of heat exchanger can be classified into two methods, i.e (1) a so-called after-coating method in which an aluminum plate is formed into fins, the fins are assembled, and the assembly is coated with a surface-treating agent (having hydrophilicity and rust-preventive property) by means of dipping, spraying, showering or the like and (2) a so-called precoating method in which a hydrophilic film is formed on the surface of an aluminum plate by means of roll coater or the like and the resulting plate is subjected to press forming to produce fins. In the latter method (2), when the hydrophilic film formed contains an inorganic component(s) such as silica, water glass, alumina, aluminum hydroxide, calcium carbonate, titania or (and) the like, the mold used in press forming undergoes severe abrasion, inviting formation of defective fins, lower corrosion resistance owing to breakage of hydrophilic film and economical loss owing to shorter mold life.

Meanwhile, press forming is seeing a change. That is, conventional drawing (bulging and deep drawing) is being changed to severer drawless forming (ironing). When this severer forming is employed, the above-mentioned conventional methods for surface treatment are not applicable.

As the methods for hydrophilization, usable in such severer forming, the following methods were proposed.

(1) A hydrophilization method of using, in combination, a polyvinyl alcohol, a particular water-soluble polymer and a water-soluble crosslinking agent [Japanese Patent Application Kokai (Laid-Open) No. 26381/1991 and Japanese Patent Application Kokai (Laid-Open) No. 299877/1989].

(2) A hydrophilization method of using, in combination, a block copolymer containing hydrophilic polymer moieties composed of a particular hydrophilic monomer and hydrophobic polymer moieties and a metal chelate crosslinking agent [Japanese Patent Application Kokai (Laid-Open) No. 107678/1990 and Japanese Patent Application Kokai (Laid-Open) No. 202967/1990].

(3) A hydrophilization method of using a polyacrylamide resin [Japanese Patent Application Kokai (Laid-Open) No. 104667/1989 and U.S. Pat. No. 4,954,372 (this corresponds to Japanese Patent Application Kokai (Laid-Open) No. 270977/1989)].

(4) A hydrophilization method of using, in combination, a polymer (e.g. a polyacrylic acid) and a polymer (e.g. a polyethylene oxide or a polyvinylpyrrolidone) capable of forming a polymer complex with the former polymer via hydrogen bond [EP-A-620,256 (this corresponds to Japanese Patent Application Kokai (Laid-Open) No. 322292/1994].

The coating films formed by these hydrophilization methods have little problem in press forming, but have problems in hydrophilicity retention or water-insolubility.

As seen from above, many techniques were proposed for hydrophilization of heat exchanger fins. However, no hydrophilization method is developed yet which satisfies all of hydrophilicity retention, film stability and press formability.

The present inventors paid attention on hydrophilic polymer fine particles and continued a study on a process for production thereof and a method for utilization thereof. In the course of the study, the present inventors attempted to solve the above-mentioned problems by using a hydrophilization composition containing hydrophilic polymer fine particles. As a result, the present inventors found out that the above problems could be solved by using a combination of particular hydrophilic polymer fine particles and a particular binder resin. The finding has led to the completion of the present invention.

SUMMARY OF THE INVENTION

According to the present invention, there is provided a composition used for hydrophilization, which comprises:

(A) a compound having a polyoxyalkylene chain represented by the following formula:

(wherein R is a hydrogen atom or a methyl group and k is an integer of 3 or more), and (B) hydrophilic crosslinked polymer fine particles made of a copolymer composed of:

2–50% by weight of (a) a hydrophilic monomer having, in the molecule, at least one polymerizable double bond and a polyoxyalkylene or polyvinylpyrrolidone chain, 20–97% by weight of (b) at least one (meth)acrylamide type monomer selected from the compounds represented by the following formula [1]:

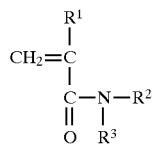

(wherein $R^1$ is a hydrogen atom or a methyl group; and $R^2$ and $R^3$, which may be the same or different, are each a hydrogen atom or an alkyl group of 1–5 carbon atoms with a proviso that the sum of the carbon atoms of $R^2$ and $R^3$ is 5 or less), 1–30% by weight of (c) at least one crosslinkable unsaturated monomer selected from the compounds having at least two polymerizable double bonds in the molecule and the compounds having, in the molecule, one polymerizable double bond and at least one functional group selected from a hydrolyzable silyl group, an epoxy group, an N-methylol group and an N-alkoxymethyl group, 2–50% by weight of (d) a carboxyl group-containing polymerizable unsaturated monomer, and 0–50% by weight of (e) a monomer having one polymerizable unsaturated group in the molecule, other than the monomers (a), (b), (c) and (d).

The present invention further provides a method for hydrophilization of heat exchanger fins made of aluminum, which comprises coating the above hydrophilization composition on the fins.

The present invention furthermore provides heat exchanger fins made of aluminum, having, as the surface layer, a coating film made of the above hydrophilization composition.

DETAILED DESCRIPTION OF THE INVENTION

The present invention is hereinafter described in more detail.
Compound (A) having a polyoxyalkylene chain The component (A) in the present composition is a compound having a polyoxyethylene or polyoxypropylene chain represented by the following formula:

(wherein R is a hydrogen atom or a methyl group, and k is an integer of 3 or more, preferably 5–2,500, more preferably 70–2,000).

Typical examples of the compound (A) include the followings.

(1) Polyethylene glycol, polypropylene glycol and block polyoxyalkylene glycols wherein a polyoxyethylene chain and a polyoxypropylene chain are bonded in blocks.

(2) Compounds obtained by subjecting the hydroxyl group (s) at one or both ends of a polyethylene glycol, a polypropylene glycol or the above block polyoxyalkylene glycol, to etherification with a monoalcohol, a polyalcohol or a phenol, or to esterification with a monobasic acid.

The monoalcohol, the polyalcohol and the phenol, all usable in the etherification include, for example, monoalcohols such as methanol, ethanol, isopropanol, n-butanol, isobutanol and the like; polyalcohols such as butanediol, neopentyl glycol, hexanediol, di(hydroxymethyl) cyclohexane, glycerine, diglycerine, trimethylolethane, trimethylolpropane, pentaerythritol and the like; and phenols such as phenol, bisphenol A, bisphenol F and the like.

The monobasic acid usable in the esterification includes, for example, formic acid, acetic acid, propionic acid, butyric acid, hydroxyacetic acid, lactic acid, benzoic acid and p-t-butylbenzoic acid.

(3) Polymers of a polymerizable unsaturated monomer having a polyoxyethylene chain or a polyoxypropylene chain, and copolymers of said monomer with other monomer.

The compound (A) contains the moieties of a polyoxyethylene or polyoxypropylene chain in an amount of 50% by weight or more, preferably 65% by weight or more, more preferably 80% by weight or more. The compound (A) is preferably a compound containing the moieties of a polyoxyethylene chain in an amount of 50% by weight or more, preferably 80% by weight or more, particularly preferably a polyethylene glycol.

The molecular weight of the compound (A) is not particularly restricted, but is generally 500–500,000, preferably 1,000–300,000, particularly preferably 3,000–100,000 in terms of number-average molecular weight.

The compound (A) having a polyoxyalkylene chain can be used independently or in combination of two or more.
Hydrophilic crosslinked polymer fine particles (B)

The component (B) in the present composition is hydrophilic crosslinked polymer fine particles made of a copolymer composed of the following monomers (a), (b), (c), (d) and (e).
Hydrophilic monomer (a)

The hydrophilic monomer (a) is a compound having, in the molecule, at least one polymerizable double bond and a polyoxyalkylene or polyvinylpyrrolidone chain. Typical examples thereof include the compounds represented by the following general formulas [2], [3] and [4]:

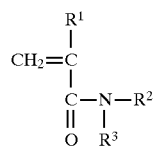

[2]

[wherein $R^4$, $R^5$ and $R^6$, which may be the same or different, are each a hydrogen atom or a methyl group; n is an integer of 10–200; $R^7$ is —OH, —OCH$_3$, —SO$_3$H or —SO$_3^-$M$^+$ (where M$^+$ is Na$^+$, K$^+$, Li$^+$, NH$_4^+$ or an organic ammonium group); $R^6$ s in the n groups represented by:

may be the same or different; the above organic ammonium group may be a primary, secondary, tertiary or quaternary organic ammonium group, and the nitrogen atom has at least one organic group and 0–3 hydrogen atoms bonded thereto; examples of the organic group are an alkyl group of 1–8 carbon atoms, an aryl group and an aralkyl group, all of which may contain a hetero atom(s) such as O, S, N or (and) the like],

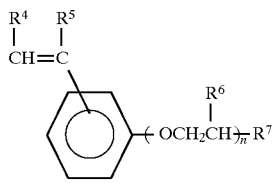

[3]

(wherein $R^4$, $R^5$, $R^6$, $R^7$ and n have the same definitions as given above),

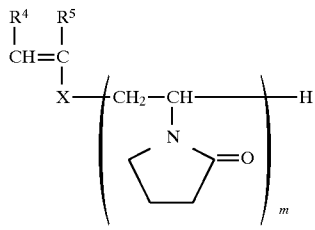

[4]

(wherein $R^4$ and $R^5$ have the same definitions as given above; X is a bivalent organic group having 5–10 carbon atoms, which may contain an O, S or N atom(s); and m is an integer of 10–100, preferably 15–90, more preferably 20–70).

Specific examples of the "bivalent organic group having 5–10 carbon atoms, which may contain an O, S or N atom(s)" represented by X in the above general formula [4] include a group represented by the following formula:

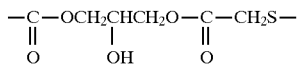

The monomer (a) is preferably a compound of formula [2] or [3] wherein n is 15–200, particularly 30–200, in view of, for example, the dispersion stability of the resulting polymer fine particles when the monomer (b) is used in a large amount.

(Meth)acrylamide type monomer (b)

The (meth)acrylamide type monomer (b) is at least one compound selected from the compounds represented by the following general formula [1]

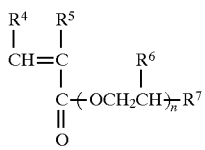

[1]

(wherein $R^1$ is a hydrogen atom or a methyl group; and $R^2$ and $R^3$, which may be the same or different, are each a hydrogen atom or an alkyl group having 1–5 carbon atoms with a proviso that the sum of the carbon atoms of $R^2$ and $R^3$ is 5 or less).

In the above formula [1], the "alkyl group having 1–5 carbon atoms" which may be represented by $R^2$ or $R^3$, can have a straight chain or a branched chain. Examples thereof are a methyl group, an ethyl group, an n-propyl group, an isopropyl group, an n-butyl group, an isobutyl group, a tert-butyl group and an amyl group.

Typical examples off the monomer (b) represented by the above general formula [1] are acrylamide, methacrylamide, N-methylacrylamide, N-methylmethacrylamide, N,N-dimethylacrylamide, N,N-dimethylmethacrylamide, N-ethylacrylamide, N-ethylmethacrylamide, N-n-propylacrylamide, N-n-propylmethacrylamide, N-isopropylacrylamide, N-isopropylmethacrylamide and N-n-butylacrylamide.

Crosslinkable unsaturated monomer (c)

The crosslinkable unsaturated monomer (c) is a component which contributes to crosslinking of particles, and is at least one compound selected from the compounds having at least two polymerizable double bonds in the molecule and the compounds having, in the molecule, one polymerizable double bond and at least one functional group selected from a hydrolyzable silyl group, an epoxy group, an N-methylol group and an N-alkoxymethyl group.

Of the crosslinkable unsaturated monomers as the component (c), those compounds (c-1) having at least two polymerizable double bonds in the molecule include, for example, N,N-methylenebis[acrylamide], N,N'-methylenebis[methacrylamide], ethylene glycol di(meth)acrylate, triethylene glycol di(meth)acrylate, tetraethylene glycol di(meth)acrylate, 1,3-butylene glycol di(meth)acrylate, 1,6-hexanediol di(meth)acrylate, trimethylolpropane tri(meth)acrylate, divinylbenzene and allyl (meth)acrylate. Of these compounds, N,N-methylenebis[acrylamide] and N,N'-methylenebis-[methacrylamide] are preferred from the standpoints of the dispersion stability and hydrophilicity of the polymer fine particles obtained.

Of the crosslinkable unsaturated monomers as the component (c), those compounds (c-2) having, in the molecule, one polymerizable double bond and at least one functional group selected from a hydrolyzable silyl group, an epoxy group, an N-methylol group and an N-alkoxymethyl group, include the compounds mentioned below. Incidentally, in the present specification, "hydrolyzable silyl group" refers to a silicon-containing group which forms a silanol group (Si—OH) upon hydrolysis, and includes, for example, a group represented by the following formula:

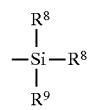

(wherein two $R^8$'s may be the same or different and are each a hydrogen atom, a hydrocarbon group having 1–18 carbon atoms, an alkoxy group having 1–4 carbon atoms or an alkoxy-substituted alkoxy group having 2–4 carbon atoms; and $R^9$ is an alkoxy group having 1–4 carbon atoms or an alkoxy-substituted alkoxy group having 2–4 carbon atoms).

Typical examples of the compounds (c-2) include unsaturated compounds having a hydrolyzable silyl group, such as γ-methacryloyloxypropyltrimethoxysilane, γ-acryloyloxypropyl trimethoxysilane, vinyltriethoxysilane, vinyl trimethoxysilane, 2-styrylethyltri-methoxysilane, vinyltris(methoxyethoxy)silane and the like; unsaturated compounds having an epoxy group, such as glycidyl (meth) acrylate, allyl glycidyl ether and the like; unsaturated compounds having an N-methylol group, such as N-methylolacrylamide, N-methylolmethacrylamide and the like; and unsaturated compounds having an N-alkoxymehtyl group, such as N-methoxymethylacrylamide, N-methoxymethylmethacrylamide, N-ethoxymethylacrylamide, N-ethoxymethylmethacrylamide, N-butoxymethylacrylamide, N-butoxymethylmethacrylamide and the like. Of these compounds, unsaturated compounds having an N-methylol group or an N-alkoxymethyl group having 1–7 carbon atoms in the alkoxy moiety are preferred in view of, for example, the stability of formed polymer fine particles in organic solvent.

Carboxyl group-containing polymerizable unsaturated monomer (d)

The carboxyl group-containing polymerizable unsaturated monomer (d) can be any monomer as long as it is a compound having, in the molecule, at least one carboxyl group and one polymerizable unsaturated group. Typical examples thereof include acrylic acid, methacrylic acid, crotonic acid, itaconic acid, maleic acid, fumaric acid, monobutyl itaconate and monobutyl maleate. Of these, acrylic acid and methacrylic acid are preferred. The carboxyl group of the monomer (d) forms a hydrogen bond with the compound (A) having an polyoxyalkylene chain, which contributes to the curability of the hydrophilization composition of the present invention.

Monomer (e)

The monomer (e) used optionally for forming the polymer fine particles (B) of the present invention is a compound other than the above monomers (a), (b), (c) and (d), which has one polymerizable unsaturated group in the molecule and which is copolymerizable with the monomers (a), (b), (c) and (d).

Typical examples of the monomer (e) are $C_{1-24}$ alkyl or cycloalkyl esters of (meth)acrylic acid, such as methyl (meth)acrylate, ethyl (meth)acrylate, butyl (meth)acrylate, hexyl (meth)acrylate, octyl (meth)acrylate, lauryl (meth) acrylate, cyclohexyl (meth)acrylate and the like; $C_{2-8}$ hydroxyalkyl esters of (meth)acrylic acid, such as 2-hydroxyethyl (meth)-acrylate, hydroxypropyl (meth) acrylate, hydroxybutyl (meth)acrylate and the like; polymerizable unsaturated nitrites such as acrylonitrile, methacrylonitrile and the like; aromatic vinyl compounds such as styrene, α-methylstyrene, vinyltoluene, α-chlorostyrene and the like; $C_{3-8}$ nitrogen-containing alkyl esters of (meth) acrylic acid, such as N,N-dimethylaminoethyl (meth) acrylate, N,N-dimethylaminopropyl (meth)acrylate and the like; α-olefins such as ethylene, propylene and the like; diene compounds such as butadiene, isoprene and the like; vinyl esters such as vinyl acetate, vinyl propionate and the like; and vinyl ethers such as ethyl vinyl ether, n-propyl vinyl ether and the like. These compounds can be used singly or in combination of two or more of them. Use of a hydrophobic compound in a large amount must be avoided because it gives polymer fine particles of low hydrophilicity.

When there is used, as the monomer (e), a compound having a functional group reactive with a functional group of the monomer (c-2), crosslinking can take place as a result of the reaction between the functional group of the monomer (c-2) and the functional group of the monomer (e). Incidentally, when the functional group of the monomer (c-2) is a hydrolyzable silyl group, an N-methylol group or an N-alkoxymethyl group, any of these groups can give rise to a reaction between a plurality of the same groups and consequent crosslinking. In this case, the hydrolyzable silyl group forms a siloxane bond; and the N-methylol group or N-alkoxymethyl group gives rise to a dehydration and condensation reaction or an alcohol elimination reaction to form a $(=N-CH_2-O-CH_2-N=)$ bond; thereby, crosslinking takes place.

The functional group reactive with a functional group of the monomer (c-2), which the monomer (e) can have, includes, for example, those shown in Table 1.

TABLE 1

| Functional group of monomer (c-2) | Functional group of monomer (e) reactive therewith |
|---|---|
| Hydrolyzable silyl group | Hydroxyl group, silanol group, etc. |
| Epoxy group | Amino group, hydroxyl group, etc. |
| N-Methylol group or N-alkoxymethyl group | Hydroxyl group, etc. |

In producing the hydrophilic crosslinked polymer fine particles (B) of the present invention using, as the monomer (c), a monomer (c-2) having an epoxy group, there can be used, as a portion or the whole portion of the monomer (e), a compound having a functional group reactive with the epoxy group, for example, an amino group or a hydroxyl group. When such a monomer (c-2) having an epoxy group is used, the carboxyl group of the monomer (d) can also react with the epoxy group, whereby crosslinking can take place.

The hydrophilic crosslinked polymer fine particles (B) can be used in one kind or in combination of two or more kinds.

Production of hydrophilic crosslinked polymer fine particles (B)

The hydrophilic crosslinked polymer fine particles (B) can be produced by polymerizing the hydrophilic monomer (a), the (meth)acrylamide type monomer (b), the crosslinkable unsaturated monomer (c), the carboxyl group-containing polymerizable unsaturated monomer (d) and, as necessary, the monomer (e), in the absence of any dispersion stabilizer in a water-miscible organic solvent capable of dissolving the above monomers but substantially incapable of dissolving the copolymer formed or in a mixed solvent of said water-soluble organic solvent and water.

In the polymerization, the proportions of the monomers used can be the same as those desired for the copolymer formed, and can be as follows, for example:

hydrophilic monomer (a):
  2–50% by weight, preferably 2–40% by weight, more preferably 2–35% by weight,
(meth)acrylamide type monomer (b):
  20–97% by weight, preferably 25–90% by weight, more preferably 30–80% by weight,
crosslinkable unsaturated monomer (c):
  1–30% by weight, preferably 2–25% by weight, more preferably 2–20% by weight,
carboxyl group-containing polymerizable unsaturated monomer (d):

2–50% by weight, preferably 3–40% by weight, more preferably 5–30% by weight, and monomer (e):

0–50% by weight, preferably 0–40% by weight, more preferably 0–30% by weight.

The hydrophilic monomer (a) used in production of the hydrophilic crosslinked polymer fine particles (B) contains, in the molecule, a polyoxyalkylene or polyvinylpyrrolidone chain of high hydrophilicity and plays a role of dispersing and stabilizing the polymer formed. Therefore, it is not necessary to use any dispersion stabilizer in production of the polymer fine particles (B).

In production of the polymer fine particles (B), there is used, as the reaction solvent, a water-miscible organic solvent capable of dissolving the monomers mixture but substantially incapable of dissolving the copolymer formed, or a mixed solvent of the above water-miscible organic solvent and water. Herein, "water-miscible" refers to "soluble in water at 20° C. in any proportion".

The water-miscible organic solvent can be any organic solvent as long as it satisfies the above requirement. However, particularly preferred from the standpoint of the polymerization stability is a water-miscible organic solvent containing at least 50% by weight, particularly at least 70% by weight of an organic solvent having a solubility parameter (SP) of generally 9–11, particularly 9.5–10.7. Incidentally, "solubility parameter (SP)" used in the present specification is based on the description made in Journal of Paint Technology, Vol. 42, No. 541, pp. 76–118 (February, 1970).

Examples of the water-miscible organic solvent having a SP of the above range are alkylene glycol monoalkyl ethers such as ethylene glycol monobutyl ether, propylene glycol monomethyl ether, ethylene glycol monoethyl ether, diethylene glycol monoethyl ether, diethylene glycol monobutyl ether and the like. Of these, particularly preferable are ethylene glycol monobutyl ether and propylene glycol monomethyl ether.

The water-miscible organic solvent can contain, besides the organic solvent having a SP of 9–11, other water-miscible or water-immiscible organic solvent. Preferable examples of the other organic solvent are water-miscible organic solvents such as methanol, ethanol, isopropyl alcohol and the like. Desirably, the other organic solvent is used in an amount of 50% by weight or less, particularly 30% by weight or less based on the total amount of the organic solvents.

When a mixed solvent of the water-miscible organic solvent and water is used as the reaction solvent, the preferable content of water in the mixed solvent is generally 60 parts by weight or less, particularly 40 parts by weight or less per 100 parts by weight of the water-miscible organic solvent, in view of the stability of polymerization.

The copolymerization of the hydrophilic monomer (a), the (meth)acrylamide type monomer (b), the crosslinkable unsaturated monomer (c), the carboxyl group-containing polymerizable unsaturated monomer (d) and the monomer (e) is conducted generally in the presence of a radical polymerization initiator. The radical polymerization initiator can be one known per se. The amount of the radical polymerization initiator used can be generally 0.2–5% by weight, preferably 0.3–3% by weight based on the total amount of the monomers.

The polymerization temperature can be varied depending upon the kind of the polymerization initiator used, etc., but an appropriate polymerization temperature is generally about 50-about 160° C., particularly about 70-about 140° C.

The reaction time can be about 0.5–10 hours. When the monomer (c-2) is used, a higher temperature may be used in order to allow a crosslinking reaction by the monomer (c-2) to proceed after the polymerization reaction. A crosslinking catalyst may be added as necessary to the polymerization system in order to allow the intraparticle crosslinking of polymer particles to proceed as quickly as possible during or after the polymerization reaction. The crosslinking catalyst includes, for example, strong acid catalysts such as dodecylbenzenesulfonic acid, paratoluenesulfonic acid and the like; and base catalysts such as triethylamine and the like. An appropriate crosslinking catalyst can be selected depending upon the type of crosslinking reaction.

There is no particular restriction as to the particle diameters of the thus-produced polymer fine particles (B). However, it is preferable that the polymer fine particles have an average particle diameter of generally 0.03–1 $\mu$m, preferably 0.04–0.8 $\mu$m, more preferably 0.05–0.6 $\mu$m in view of the stability of the polymer fine particles (B) formed, the prevention of formation of agglomerates, etc. This average particle diameter can be measured by the use of a particle diameter tester, for example, Coulter Model N4MD (a product of Coulter Co.).

The polymer fine particles (B) have, at the surfaces, the chemically bonded polyoxyalkylene or polyvinylpyrrolidone chains derived from the monomer (a), with the chains oriented outward. Therefore, the polymer fine particles, although containing no dispersion stabilizer, are highly superior in polymerization stability in water-miscible organic solvent or in mixed solvent of said water-miscible organic solvent and water, as well as in dispersion stability during storage, and their surfaces are highly hydrophilic.

Further, the polymer fine particles (B) are crosslinked inside the particles owing to the presence of the monomer (c) component. Therefore, the polymer fine particles can hold the shape even in an organic solvent type coating; are not easily melted when heated; and, when a film is formed with a coating containing the particles, can impart fine unevennesses on the film.

In the composition of the present invention, the proportions of the compound (A) and the polymer fine particles (B) can be appropriately determined depending upon, for example, the properties to be possessed by the composition and are not particularly restricted, but are generally 10/90 to 90/10, particularly 25/75 to 80/20, more particularly 40/60 to 70/30 in terms of the solid content weight ratio of the component (A)/the component (B).

In the present composition, both the compound (A) and the polymer fine particles (B) are highly hydrophilic and the polyoxyalkylene chain in the compound (A) and the carboxyl group in the polymer fine particles (B) form a hydrogen bond. As a result, the film formed with the present composition has good hydrophilicity but is water-insoluble. Further, since the carboxyl group capable of forming a hydrogen bond with the polyoxyalkylene chain is bonded with the hydrophilic crosslinked polymer fine particles, the film formed with the present composition has surface unevennesses and this surface condition makes the film even more hydrophilic.

The present composition may further contain, as necessary, a crosslinking agent as the component (C) in order to allow the film formed with the composition to have higher water-insolubility. The crosslinking agent (C) includes, for example, a melamine resin, a urea resin, a phenolic resin, a polyepoxy compound, a blocked polyisocyanate compound and a metal chelate compound. It is generally preferable that the crosslinking agent is water-soluble or water-dispersible. The amount of the crosslinking agent (C) used can be generally 50 parts by weight or less, preferably 1–30 parts by weight, more preferably 3–15 parts by weight based on 100 parts by weight of the total of the compound (A) and the polymer fine particles (B).

In the heat exchanger fins treated with the present composition, the contact angle between fin and water is desirably 5° or less (so-called extended wetting) when the heat exchanger has, for example, a fin-to-fin pitch of 1.2 mm or less. To meet this requirement, the present composition can further contain, as necessary, a surfactant having a wetting action as the component (D).

The surfactant (D) may be any of anionic, cationic, amphoteric or nonionic surfactants as long as it has a surface-wetting action. Typical examples of the surfactant (D) usable include a salt of dialkyl sulfosuccinate and an alkylene oxide silane compound.

These surfactants can be used independently or in combination of two or more. The amount of the surfactant used is 20 parts by weight or less, preferably 0.5–10 parts by weight, more preferably 1–5 parts by weight per 100 parts by weight of the total of the compound (A) and the polymer fine particles (B).

The composition of the present invention can furthermore contain, as necessary, an antifungal agent as the component (E) in order to prevent the generation and propagation of microorganisms. The antifungal agent (E) preferably satisfies the following requirements (1) to (5).

(1) Has low toxicity and high safety.
(2) Is stable to heat, light, acids, alkalis, etc.; is sparingly soluble in water; and exhibits the antifungal action over a long period of time.
(3) Has a fungicidal action or can prevent the growth of fungi, at a low concentration.
(4) When compounded into a paint, shows no reduction in effect and does not impair the stability of the paint.
(5) Does not impair the hydrophilicity and corrosion resistance of the film formed.

An antifungal agent meeting the above requirements can be selected from per se known aliphatic or aromatic organic compounds having antifungal and fungicidal activities. It includes, for example, antifungal agents of haloarylsulfone type, iodopropargyl type, N-haloalkylthio type, benzthiazole type, nitrile type, pyridine type, 8-oxyquinoline type, benzthiazole type, isothiazoline type, phenol type, quaternary ammonium salt type, triazine type, thiazine type, anilide type, adamantane type, dithiocarbamate type, bromoindanone type, etc.

Specific examples of the fungicidal agent are 2-(4-thiazolyl)-benzimidazole, N-(fluorodichloro-methylthio) phthalimide, N-dimethyl-N'-phenol-N'-(fluorodichloromethylthio)-sulfamide, o-phenylphenol, 10,10'-oxybisphenoxyarsine, 2,3,5,6-tetrachloro-4-(methylsulfonyl)pyridine, 2,4,5,6-tetrachloro-isophthalonitrile, diiodomethyl-p-toluylsulfone, methyl 2-benzimidazolecarbamate, bis(dimethylthiocarbamoyl) disulfide and N-(trichloromethylthio)-4-cyclohexene-1,2-dicarboxyimide. Antifungal agents of inorganic salt type can also be used, and typical examples thereof are barium metaborate, copper borate, zinc borate and zeolite (aluminosilicate).

These antifungal agents can be used independently or in combination. The amount of the antifungal agent used can be varied depending upon the kind of the agent, etc., but is generally 20 parts by weight or less, preferably 3–15 parts by weight, particularly 5–10 parts by weight per 100 parts by weight of the total of the compound (A) and the polymer fine particles (B) so that the stability and film formability of composition, the hydrophilicity of formed film, and the corrosion resistance of coated plate are not impaired.

The composition of the present invention can be prepared, for example, by dissolving or dispersing, in an aqueous medium, the compound (A), the polymer fine particles (B) and, as necessary, the crosslinking agent (C) and/or the surfactant (D) and/or the antifungal agent (E). The aqueous medium is composed mainly of water and may further contain an organic solvent and a neutralizing agent.

The present composition may also contain, as necessary, a coloring pigment, a rust-preventive pigment (e.g. chromate type, lead type or molybdic acid type), a rust preventive [e.g. phenolic carboxylic acid (e.g. tannic acid or gallic acid), salt thereof, organic phosphoric acid (e.g. phytic acid or phosphinic acid), metal biphosphate or nitrite], etc.

The present composition can be coated on a substrate such as metal, glass, wood, plastic, cloth and the like; and, by baking the resulting film, a hydrophilic cured film can be formed. The film preferably has a thickness as cured, of 0.3–5 $\mu$m, particularly 0.5–3 $\mu$m. The baking can be conducted generally at about 80° C. to about 250° C., particularly at about 100° C. to about 240° C. (in terms of the maximum temperature of substrate) for about 30 minutes to about 15 seconds.

The present composition is useful for the hydrophilization of, in particular, aluminum-made heat exchanger fins. The hydrophilization of aluminum-made heat exchanger fins can be conducted by coating said fins with the present composition. It can be conducted, for example, by applying the present composition to an aluminum plate (or an aluminum-made heat exchanger) which is sufficiently degreased and as necessary subjected to a chemical treatment, by a per se known method such as dip coating, showering coating, spray coating, roll coating, electrophoretic coating or the like, followed by baking.

As described above, the present composition can form, on a substrate, a hydrophilic film which has retainability of hydrophilicity (whole-surface wettability with water and contact angle to water, of 20° or less) and continuous formability (resistance to mold abrasion) (the prior art has been inferior in these properties) and yet has excellent corrosion resistance.

Further, the composition, when containing an antifungal agent, can significantly improve the odor caused by the propagation of fungi.

Thus, the use of aluminum-made heat exchanger fins treated with the present composition can achieve energy saving and resource saving in heat exchangers.

EXAMPLES

The present invention 5 hereinafter described specifically by way of Examples and Comparative Examples. These Examples are for detailed description of the present invention and give no restriction to the scope of the present invention. In the followings, parts and % are parts by weight and % by weight, respectively.

Production of hydrophilic crosslinked polymer fine particles

Production Example 1

200 parts of propylene glycol monomethyl ether was placed in a flask provided with a nitrogen inlet tube, an Allihn condenser, a dropping funnel and a mechanical stirrer, and heated to 118° C. Into the flask contents were dropwise added, in 5 hours, a mixture of the following monomers, solvent and polymerization initiator. Thereafter, the flask contents were kept at 118° C. for 1 hour to obtain a dispersion (a) of hydrophilic crosslinked polymer fine particles.

| Blemmer PME-4000 (Note 1) | 20 parts |
|---|---|
| Acrylamide | 50 parts |
| N-Methylolacrylamide | 20 parts |
| Acrylic acid | 10 parts |
| Propylene glycol monomethyl ether | 200 parts |
| 2,2'-Azobis(2-methylbutyronitrile) | 1.5 parts |

The resulting dispersion was opaque white and stable and had a solid content of 20%. The resin particles therein had an average particle diameter of 345 nm.

Note 1: Blemmer PME-4000 is a compound represented by the following formula, produced by Nippon Oils and Fats Co., Ltd.

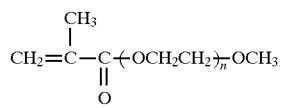

(average value of n: about 98)

Production Example 2

60 parts of propylene glycol monomethyl ether was placed in a flask provided with a nitrogen inlet tube, an Allihn condenser, a dropping funnel and a mechanical stirrer, and heated to 90° C. Thereto were dropwise added a solution consisting of 100 parts of N-vinylpyrrolidone, 2 parts of 2,2'-azobisisobtyronitrile and 5 parts of propylene glycol monomethyl ether and a solution consisting of 5 parts of mercaptoacetic acid and 30 parts of propylene glycol monomethyl ether, simultaneously each in 2 hours. The resulting mixture was kept at 90° C. for 1 hour. Thereto was dropwise added, in 1 hour, a solution consisting of 1 part of 2,2'-azobis(2,4-dimethylvaleronitrile) and 10 parts of propylene glycol monomethyl ether. The resulting mixture was stirred for 1 hour and then cooled to obtain a polyvinylpyrrolidone solution having a solid content of 50%.

To 800 parts of the polyvinylpyrrolidone solution were added 26.6 parts of glycidyl methacrylate and 1.8 parts by weight of tetaethylamonium bromide. The mixture was stirred at 110° C. for 7 hours to obtain a solution of a polyvinylpyrrolidone macromonomer represented by the following formula (the solid content of the solution: about 52%):

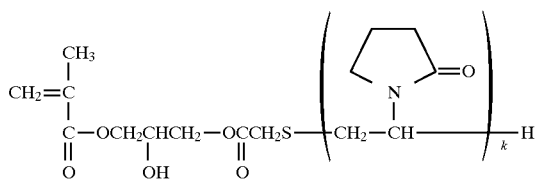

(average value of k: about 25)

Polymerization was conducted in the same manner as in Production Example 1 except that the mixture of monomers, solvent and polymerization initiator, used in Production Example 1 was changed to a mixture of the following monomers, solvent and polymerization initiator, whereby a dispersion (b) of hydrophilic crosslinked polymer fine particles were obtained.

| Solution of polyvnylpyrrolidone macromonomer, having a solid content of about 52%, obtained above | 38.5 parts |
|---|---|
| Acrylamide | 50.0 parts |
| N-Methylolacrylamide | 20.0 parts |
| Methacrylic acid | 10.0 parts |
| Propylene glycol monomethyl ether | 181.5 parts |
| 2,2'-Azobis(2-methylbutyronitrile) | 1.5 parts |

The resulting dispersion was opaque white and stable and had a solid content of 20%. The resin particles therein had an average particle diameter of 254 nm.

Production Example 3

200 parts of propylene glycol monomethyl ether was placed in a flask provided with a nitrogen inlet tube, an Allihn condenser, a dropping funnel and a mechanical stirrer, and heated to 80° C. Into the flask contents were dropwise added, in 5 hours, a mixture of the following monomers, solvent and polymerization initiator. Thereafter, the flask contents were kept at 80° C. for 2 hours to obtain a dispersion (c) of hydrophilic crosslinked polymer fine particles.

| Blemmer PME-4000 | 20 parts |
|---|---|
| Acrylamide | 50 parts |
| N-Methylolacrylamide | 15 parts |
| Acrylic acid | 10 parts |
| N,N'-Methylenebis[acrylamide] | 5 parts |
| Propylene glycol monomethyl ether | 150 parts |
| Deionized water | 50 parts |
| Ammonium persulfate | 1.5 parts |

The resulting dispersion was opaque white and stable and had a solid content of 20%. The resin particles therein had an average particle diameter of 320 nm.

Production Example 4

170 parts of propylene glycol monomethyl ether was placed in a flask provided with a nitrogen inlet tube, an Allihn condenser, a dropping funnel and a mechanical stirrer, and heated to 80° C. Into the flask contents were dropwise added, in 5 hours, a mixture of the following monomers, solvent and polymerization initiator. Thereafter, the flask contents were kept at 80° C. for 2 hours to obtain a dispersion (d) of hydrophilic crosslinked polymer fine particles.

| Blemmer PME-4000 | 30 parts |
|---|---|
| Acrylamide | 45 parts |
| Acrylic acid | 15 parts |
| Glycidyl methacrylate | 10 parts |
| Propylene glycol monomethyl ether | 150 parts |
| Deionized water | 80 parts |
| Ammonium persulfate | 1.5 parts |

The resulting dispersion was opaque white and stable and had a solid content of 20%. The resin particles therein had an average particle diameter of 163 nm.

Production Example 5

170 parts of propylene glycol monomethyl ether was placed in a flask provided with a nitrogen inlet tube, an Allihn condenser, a dropping funnel and a mechanical stirrer, and heated to 80° C. Into the flask contents were dropwise added, in 5 hours, a mixture of the following monomers, solvent and polymerization initiator. Thereafter, the flask contents were kept at 80° C. for 2 hours to obtain a dispersion (e) of hydrophilic crosslinked polymer fine particles.

| | |
|---|---|
| Blemmer PME-4000 | 30 parts |
| Acrylamide | 60 parts |
| γ-Methacryloxypropyltrimethoxysilane | 10 parts |
| Propylene glycol monomethyl ether | 150 parts |
| Deionized water | 80 parts |
| Ammonium persulfate | 1.5 parts |

The resulting dispersion was opaque white and stable and had a solid content of 20%. The resin particles therein had an average particle diameter of 128 nm.

Production Example 6

200 parts of ethylene glycol monobutyl ether was placed in a flask provided with a nitrogen inlet tube, an Allihn condenser, a dropping funnel and a mechanical stirrer, and heated to 140° C. Into the flask contents were dropwise added, in 5 hours, a mixture of the following monomers, solvent and polymerization initiator. Thereafter, the flask contents were kept at 140° C. for 1 hour to obtain a dispersion (f) of hydrophilic crosslinked polymer fine particles.

| | |
|---|---|
| RMA-300M (Note 2) | 15 parts |
| Acrylamide | 55 parts |
| N-Butoxymethylacrylamide | 15 parts |
| 2-Hydroxyethyl methacrylate | 15 parts |
| Ethylene glycol monobutyl ether | 200 parts |
| 2,2'-Azobis(2-methylbutyronitrile) | 1.5 parts |

The resulting dispersion was opaque white and stable and had a solid content of 20%. The resin particles therein had an average particle diameter of 441 nm.

Note 2: RMA-300M is a compound represented by the following formula, produced by Nippon Nyukazai Co., Ltd.

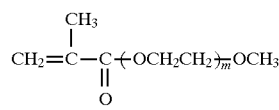

(average value of m: about 30)

Production of compounds having a polyoxyalkylene chain

Production Example 7

150 parts of water was fed into a four-necked flask. Thereto was added 100 parts of flaky PEG 20,000 (a polyethylene glycol having a number-average molecular weight of 20,000, a product of SANYO CHEMICAL INDUSTRIES, LTD.) at 50° C. with stirring, to obtain an aqueous polyethylene glycol solution (g) having a solid content of 40%.

Production Example 8

An operation was conducted in the same manner as in Production Example 7 except that the PEG 20,000 was replaced by SANNIX PP-4,000 (a polypropylene glycol having a number-average molecular weight of about 4,100, a product of SANYO CHEMICAL INDUSTRIES, LTD.) to obtain an aqueous polypropylene glycol solution (h) having a solid content of 40%.

Production Example 9

An operation was conducted in the same manner as in Production Example 7 except that the PEG 20,000 was replaced by a polyethylene glycol monomethyl ether having a number-average molecular weight of about 4,000 to obtain an aqueous polyethylene glycol monomethyl ether solution (i) having a solid content of 40%.

Production Example 10

200 parts of ethylene glycol monobutyl ether was placed in a flask provided with a nitrogen inlet tube, an Allihn condenser, a dropping funnel and a mechanical stirrer, and heated to 140° C. Into the flask contents were dropwise added, in 5 hours, a mixture of the following monomers, solvent and polymerization initiator. Thereafter, the flask contents were kept at 140° C. for 1 hour to obtain a polymer solution (j). The polymer had a number-average molecular weight of about 20,000.

| | |
|---|---|
| Blemmer PME-4000 | 60 parts |
| Acrylamide | 30 parts |
| 2-Hydroxyethyl methacrylate | 10 parts |
| Propylene glycol monomethyl ether | 200 parts |
| 2,2'-Azobis(2-methylbutyronitrile) | 1.5 parts |

Production of hydrophilization compositions

Example 1

65 parts (in terms of solid content) of the aqueous polyethylene glycol solution (g) obtained in Production Example 7 and 35 parts (in terms of solid content) of the dispersion (a) of hydrophilic crosslinked polymer fine particles, obtained in Production Example 1 were mixed. Thereto was added water to obtain a hydrophilization composition having a solid content of 10%.

Examples 2–11 and Comparative Examples 1–3

Operations were conducted in the same manner as in Example 1 except that a solution of a compound having a polyoxyalkylene chain, obtained in one of the Production Examples, a dispersion of hydrophilic crosslinked polymer fine particles, obtained in one of the Production Examples and, as necessary, a crosslinking agent, a surfactant and an antifungal agent were compounded as shown in Table 2, whereby various hydrophilization compositions each having a solid content of 10% were obtained.

Each amount shown in Table 2 refers to an amount based on solid content. Also in Table 2, the kinds of each crosslinking agent, each surfactant and each antigungal agent are as follows.

Crosslinking agents
    A: Cymel 370 (trade name) manufactured by Mitsui-Cytec Industries, which is a methylated melamine resin.
    B: Cymel UFR 65 (trade name) manufactured by Mitsui-Cytec Industries, which is a methylated urea resin.
Surfactants
    a: Newcol 290M (trade name) manufactured by Nippon Nyukazai Co. , Ltd. which is a sodium salt of dialkyl sulfosuccinate.

b: Silwet L-77 (trade name) manufactured by Nippon Unicar Company Limited, which is an alkylene oxide silane compound.

Antifungal agent

I: 2-(4-Thiazolyl)benzimidazole

Comparative Example 4

614 parts of water was fed into a four-necked flask. Therein was dissolved, at 85° C. with stirring, 100 parts of a flaky saponified polyvinyl alcohol [Poval PVA-117 (trade name) manufactured by Kuraray Co., Ltd. saponification value of about 96%] to obtain an aqueous polyvinyl alcohol solution having a solid content of about 14%. The solution was mixed with 5 parts (in terms of effective component amount) of Titabond 50 [a product of Nippon Soda Co., Ltd. which is a titanium chelate solution containing, as the effective component, diisopropoxy-bis(acetylacetonato) titanium (IV)], followed by addition of water, to obtain a hydrophilization composition having a solid content of 10%.

Comparative Example 5

To 65 parts (in terms of solid content) of the aqueous polyvinyl alcohol solution having a solid content of about 14%, obtained in Comparative Example 4 was added 35 parts (in terms of solid content) of the dispersion (a) of hydrophilic crosslinked polymer fine particles, obtained in Production Example 1. The mixture was mixed with 5 parts (in terms of effective component amount) of Titabond 50, followed by addition of water to obtain a hydrophilization composition having a solid content of 10%.

Each of the compositions for hydrophilization, obtained in the above Examples and Comparative Examples was coated, in a film thickness (as dried) of 1 micron, on an aluminum plate (A1050 having a thickness of 0.1 mm) which had been subjected to (1) degreasing using an aqueous solution containing 2% of an alkali degreasing agent [Chemi-Cleaner 561B (trade name) manufactured by Japan Cee Bee Chemical Co., Ltd.] and (2) a chromate treatment [amount (in terms of metal chromium) coated: 30 mg/m$^2$] using a chromate treating agent [Alchrom 712 (trade name) manufactured by Nihon Parkerizing Company Limited]. Baking was conducted for 30 seconds using a hot air of 240° C. so that the maximum temperature of substrate became 230° C., whereby coated plates were obtained.

A volatile lubrication oil for press forming was coated on each of the coated plates, followed by drying at 150° C. for 5 minutes, whereby coated plates for testing were obtained. These plates were tested for film appearance, hydrophilicity and corrosion resistance. The results are shown in Table 3.

The tests in Table 3 were conducted according to the following test methods.

Film appearance

A coated plate for testing was evaluated visually. A plate whose film had no abnormality, was rated as ○.

Hydrophilicity

Wettability with water and angle of contact with waterdrop were measured according to the following methods, for (1) a coated plate for testing and (2) a coated plate obtained by repeating five times (5 cycles) a wet and dry cycle which comprises dipping the plate (1) in a running tap water (flow rate=15 kg per m$^2$ of plate per hour) for 7 hours, pulling up and drying in a room for 17 hours.

Wettability with water

A coated plate for testing or a coated plate after wet and dry cycles was dipped in a beaker containing tap water for ten seconds and then pulled up. The condition of wetting with water, of the surface of the pulled-up plate was rated visually.

○: Even 10 seconds after pulling-up, the whole surface is wet with water and there is no uneven distribution of water.

Δ: The whole surface is wet with water immediately after pulling-up. 10 seconds after pulling-up, however, water is gathered from edge portion to the center portion of plate.

X : Waterdrops are formed immediately after pulling-up and no surface portion is wet with water.

Contact angle

Contact angle between (a) coated plate for testing or coated plate after wet and dry cycles and (b) water was measured after drying the plate at 80° C. for 5 minutes and cooling in a desiccator, by the use of Contact-Angle Meter DCAA manufactured by Kyowa Interface Science Co., Ltd.

Corrosion resistance

This was measured by JIS Z 2371 (Methods for Neutral Salt Spray Testing). The test duration was 500 hours.

A case where there was neither white rust nor bulging, was rated as good (○)

A case where there was slight white rust or slight bulging, was rated as slightly inferior (Δ).

Antifungal property

This was measured under the following conditions on the coated plates for testing, of Examples 6 and 9, and the condition of generation of fungi on film surface after given length of time (28 days) was rated visually. None of the coated plates showed any generation of fungi on the surface.

Test condition: A peptone glucose medium was made in a sterilization dish. Thereon was placed a coated plate for testing. Thereon was sprayed a suspension of mixed spores of Cladosporium sp., Penicillum sp., Altarnaria sp., Aspergillus sp. and Trichoderma sp., in peptone glucose, followed by incubation at 26±2° C. for 28 days.

TABLE 2

|  | Compound having polyoxyalkylene chain | | Hydrophilic crosslinked polymer fine particles | | Crosslinking agent | | Surfactant | | Antifungal agent | |
| --- | --- | --- | --- | --- | --- | --- | --- | --- | --- | --- |
|  | Kind | Amount | Kind | Amount | Kind | Amount | Kind | Amount | Kind | Amount |
| Example 1 | g | 65 | a | 35 |  |  |  |  |  |  |
| Example 2 | g | 70 | b | 30 |  |  |  |  |  |  |
| Example 3 | g | 80 | c | 20 |  |  |  |  |  |  |
| Example 4 | g | 50 | d | 50 |  |  |  |  |  |  |
| Example 5 | g | 40 | e | 60 |  |  |  |  |  |  |
| Example 6 | g | 65 | f | 35 |  |  |  |  | I | 5 |

TABLE 2-continued

|  | Compound having polyoxyalkylene chain | | Hydrophilic crosslinked polymer fine particles | | Crosslinking agent | | Surfactant | | Antifungal agent | |
|---|---|---|---|---|---|---|---|---|---|---|
|  | Kind | Amount | Kind | Amount | Kind | Amount | Kind | Amount | Kind | Amount |
| Example 7 | g | 65 | a | 35 | A | 5 | a | 1 |  |  |
| Example 8 | h | 50 | b | 50 | B | 5 |  |  |  |  |
| Example 9 | g | 50 | d | 50 | A | 5 |  |  | I | 5 |
| Example 10 | i | 65 | a | 35 |  |  | b | 1 |  |  |
| Example 11 | j | 65 | a | 35 | A | 5 | a | 1 |  |  |
| Comparative Example 1 | — | — | b | 100 |  |  |  |  |  |  |
| Comparative Example 2 | g | 100 | — | — |  |  |  |  |  |  |
| Comparative Example 3 | j | 100 | — | — | A | 5 | a | 1 |  |  |

TABLE 3

|  |  | Hydrophilicity | | | | |
|---|---|---|---|---|---|---|
|  |  | Initial | | After 5 wet and dry cycles | | |
|  | Film appearance | Wettability with water | Angle of contact with water | Wettability with water | Angle of contact with water | Corrosion resistance |
| Example 1 | ○ | ○ | 5–10° | ○ | 20° > | ○ |
| Example 2 | ○ | ○ | 5° > | ○ | 20° > | ○ |
| Example 3 | ○ | ○ | 5° > | ○ | 20° > | ○ |
| Example 4 | ○ | ○ | 5° > | ○ | 20° > | ○ |
| Example 5 | ○ | ○ | 5–10° | ○ | 20° > | ○ |
| Example 6 | ○ | ○ | 5–10° | ○ | 20° > | ○ |
| Example 7 | ○ | ○ | 5° > | ○ | 20° > | ○ |
| Example 8 | ○ | ○ | 5–10° | ○ | 20° > | ○ |
| Example 9 | ○ | ○ | 5° > | ○ | 20° > | ○ |
| Example 10 | ○ | ○ | 5° > | ○ | 20° > | ○ |
| Example 11 | ○ | ○ | 5° > | ○ | 20° > | ○ |
| Comparative Example 1 | ○ | Δ | 35° | Δ | 50° | Δ |
| Comparative Example 2 | ○ | Δ | 57° | —* | —* | x |
| Comparative Example 3 | ○ | ○ | 15° | ○ | 45° | ○ |
| Comparative Example 4 | ○ | ○ | 30° | ○ | 50° | ○ |
| Comparative Example 5 | ○ | ○ | 20° | ○ | 40° | ○ |

*Measurement was impossible because the film of the coated plate dissolved in running tap water.

What is claimed is:

1. A composition used for hydrophilization, which comprises:
   (A) a polyethylene glycol having a number-average molecular weight of 500 to 500,000, and
   (B) hydrophilic crosslinked polymer fine particles made of a copolymer consisting essentially of:
      2–50% by weight of (a) a hydrophilic monomer having, in the molecule, at least one polymerizable double bond and a polyoxyalkylene or polyvinylpyrrolidone chain,
      20–97% by weight of (b) at least one (meth)acrylamide type monomer selected from the compounds represented by the following formula (1):

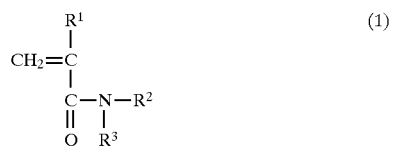

(wherein $R^1$ is a hydrogen atom or a methyl group; and $R^2$ and $R^3$, which may be the same or different, are each a hydrogen atom or an alkyl group of 1–5 carbon atoms with a proviso that the sum of the carbon atoms of $R^2$ and $R^3$ is 5 or less), 1–30% by weight of (c) at least one crosslinkable unsaturated monomer selected from the group consisting of N,N'-methylenebis(acrylamide), N,N'-methylenebis(methacrylamide) and unsaturated compounds having an N-methylol group or an N-alkoxymethyl group of 1–7 carbon atoms in the alkoxy moiety,
      2–50% by weight of (d) a carboxyl group-containing polymerizable unsaturated monomer, and
      0–50% by weight of (e) a monomer having one polymerizable unsaturated group in the molecule, other than the monomers (a), (b), (c) and (d).

2. The composition according to claim 1, wherein the hydrophilic monomer (a) is a compound represented by the following formulae (2), (3) or (4):

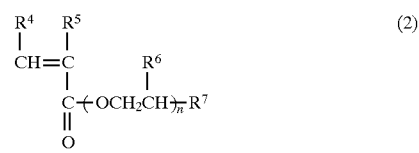

wherein $R^4$, $R^5$ and $R^6$, which may be the same or different, are each a hydrogen atom or a methyl group; n is an integer of 10–200; $R^7$ is —OH, —OCH$_3$, —SO$_3$H or SO$_3^-$M$^+$ (where $M^+$ is $Na^+$, $K^+$, $Li^+$, $NH_4^+$ or an organic ammonium group); and $R^6$'s in the n groups are represented by:

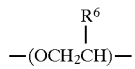

and may be the same or different,

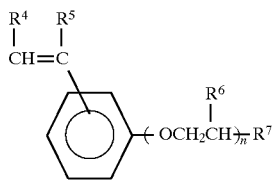

(wherein $R^4$, $R^5$, $R^6$, $R^7$ and n have the same definitions as given above),

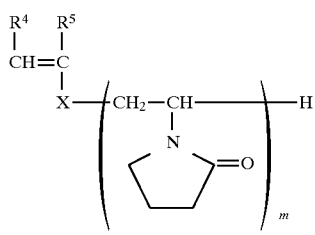

(wherein $R^4$ and $R^5$ have the same definitions as given above; X is a bivalent organic group having 5–10 carbon atoms, which may contain an O, S or N atom(s); and m is an integer of 10–100).

3. The composition according to claim 2, wherein the hydrophilic monomer (a) is a compound represented by the formula (2)

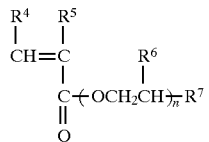

wherein $R^4$, $R^5$ and $R^6$, which may be the same or different, are each a hydrogen atom or a methyl group; n is an integer of 10–200; $R^7$ is —OH, —$OCH_3$, —$SO_3H$ or $SO_3^-M^+$ (where $M^+$ is $Na^+$, $K^+$, $Li^+$, $NH_4^+$ or an organic ammonium group); and $R^6$'s in the n groups are represented by:

and may be the same or different, or (3)

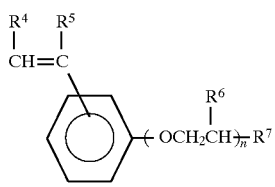

(wherein $R^4$, $R^5$, $R^6$, $R^7$ and n have the same definitions as given above).

4. The compound according to claim 3, wherein the n in the formula (2) is a compound represented by the formula:

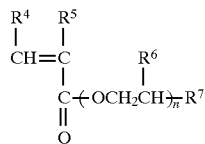

wherein $R^4$, $R^5$ and $R^6$, which may be the same or different, are each a hydrogen atom or a methyl group; n is an integer of 10–200; $R^7$ is —OH, —$OCH_3$, —$SO_3H$ or $SO_3^-M^+$ (where $M^+$ is $Na^+$, $K^+$, $Li^+$, $NH_4^+$ or an organic ammonium group); and $R^6$'s in the n groups are represented by:

and may be the same or different, or (3)

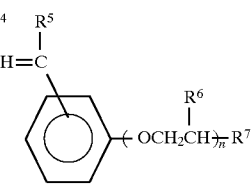

(wherein $R^4$, $R^5$, $R^6$, $R^7$ and n have the same definitions as given above), and is 30–200.

5. The composition according to claim 1, wherein the (meth)acrylamide type monomer (b) is selected from the group consisting of acrylamide, methacrylamide, N-methylacrylamide, N-methylmethacrylamide, N,N-dimethylacrylamide, N,N-dimethylmethacrylamide, N-ethylacrylamide, N-ethylmethacrylamide, N-n-propylacrylamide, N-n-propylmethacrylamide, N-isopropylacrylamide, N-isopropylmethacrylamide, and N-n-butylacrylamide.

6. The composition according to claim 1, wherein the carboxyl group-containing polymerizable unsaturated monomer (d) is selected from the group consisting of acrylic acid, methacrylic acid, crotonic acid, itaconic acid, maleic acid, fumaric acid, monobutyl itaconate and monobutyl maleate.

7. The composition according to claim 1, wherein the monomer (e) is selected from the group consisting of a $C_{1-24}$ alkyl or cycloalkyl ester of (meth)acrylic acid, a $C_{2-8}$ hydroxyalkyl ester of (meth)acrylic acid, a polymerizable unsaturated nitrile, an aromatic vinyl compound, a $C_{3-8}$ nitrogen-containing alkyl ester of (meth)acrylic acid, an α-olefin, a diene compound, a vinyl ester and a vinyl ether.

8. The composition according to claim 1, wherein the monomer (e) is selected from the group consisting of methyl (meth)acrylate, ethyl (meth)acrylate, butyl (meth)acrylate, hexyl (meth)acrylate, octyl(meth)acrylate, lauryl (meth) acrylate, cyclohexyl (meth)acrylate, 2-hydroxyethyl (meth) acrylate, hydroxypropyl (meth)acrylate, hydroxybutyl (meth)acrylate, acrylonitrile, methacrylonitrile, styrene, α-methylstyrene, vinyltoluene, α-chlorostyrene, N,N-dimethylaminoethyl (meth)acrylate, N,N-dimethylaminopropyl (meth)acrylate, ethylene, propylene, butadiene, isoprene, vinyl acetate, vinyl propionate, ethyl vinyl ether and n-propyl vinyl ether.

9. The composition according to claim 1, wherein the hydrophilic crosslinked polymer fine particles are a copolymer composed of:
2–40% by weight of the hydrophilic monomer (a),
30–97% by weight of the (meth)acrylamide type monomer (b), 2–20% by weight of the crosslinkable unsaturated monomer (c), 5–40% by weight of the carboxyl group-containing polymerizable unsaturated monomer (d), and 0–30% by weight of the monomer (e).

10. The composition according to claim 1, wherein the hydrophilic crosslinked polymer fine particles (B) are produced by polymerizing the hydrophilic monomer (a), the (meth)acrylamide type monomer (b), the crosslinkable unsaturated monomer (c), the carboxyl group-containing polymerizable unsaturated monomer (d) and optionally, the monomer (e), in the absence of any dispersion stabilizer in a water-miscible organic solvent capable of dissolving the above monomers but substantially incapable of dissolving the copolymer formed or in a mixed solvent of said water-soluble organic solvent and water.

11. The composition according to claim 1, wherein the hydrophilic crosslinked polymer fine particles (B) have an average particle diameter in the range of 0.03–1 μm.

12. The composition according to claim 1, wherein the ratio of the amount of compound (A) having a polyoxyalkylene chain and the hydrophilic crosslinked polymer fine particles (B) is in the range of 10/90 to 90/10 in terms of the solid content weight ratio of (A)/(B).

13. The composition according to claim 12, wherein the solid content weight ratio (A)/(B) is in the range of 40/60 to 70/30.

14. The composition according to claim 1, which further comprises:

(C) a crosslinking agent.

15. The composition according to claim 14, wherein the crosslinking agent (C) is selected from the group consisting of a melamine resin, a urea resin, a phenolic resin, a polyepoxy resin, a blocked polyisocyanate compound and a metal chelate compound.

16. The composition according to claim 1, which further comprises:

(D) a surfactant having a wetting activity.

17. The composition according to claim 16, wherein the surfactant (D) is selected from the group consisting of a salt of dialkyl sulfosuccinate and an alkylene oxide silane compound.

18. The composition according to claim 1, which further comprises:

(E) an antifungal agent.

19. The composition according to claim 18, wherein the antifungal agent (E) is selected from the group consisting of 2-(4-thiazolyl)-benzimidazole, N-(fluorodichloromethylthio)phthalimide, N-dimethyl-N'-phenol-N'-(fluorodichloromethylthio)-sulfamide, o-phenylphenol, 10,10'-oxybisphenoxyarsine, 2,3,5,6-tetrachloro-4-(methylsulfonyl)pyridine, 2,4,5,6-tetrachloroisophthalonitrile, diiodomethyl-p-toluylsulfone, methyl 2-benzimidazolecarbamate, bis(dimethylthiocarbomoyl) disulfide and N-(trichloromethylthio)-4-cyclohexene-1,2-dicarboxyimide.

* * * * *